July 26, 1938. B. L. LEWIS 2,125,116

UNIVERSAL TESTING MACHINE

Filed Aug. 28, 1935

INVENTOR
Bruce L. Lewis,
BY
Robert M. Barr
ATTORNEY

Patented July 26, 1938

2,125,116

UNITED STATES PATENT OFFICE 2,125,116

UNIVERSAL TESTING MACHINE

Bruce L. Lewis, Philadelphia, Pa., assignor to Tinius Olsen Testing Machine Company, Philadelphia, Pa., a corporation of Pennsylvania Application August 28, 1935, Serial No. 38,175

7 Claims. (Cl. 265—14)

The present invention relates to testing apparatus and more particularly to an improved tension and/or compression testing machine.

Some of the objects of the present invention are to provide an improved testing machine; to provide a testing machine wherein the movable bottom cross yoke common to testing machines heretofore in use is eliminated; to provide a testing machine wherein a correction factor for variation in the position of the straining rods is not required; to provide a testing machine which is simple in construction and economical to manufacture and assemble; to provide a testing machine wherein under conditions of side thrust more accurate readings are obtainable than has heretofore been possible; and to provide other improvements as will hereinafter appear.

In the accompanying drawing Fig. 1 represents a plan of a testing machine embodying one form of the present invention; Fig. 2 represents a front elevation partly broken away of the same; Fig. 3 represents a sectional detail of the stay plate assembly; and Fig. 4 represents a section on line 4—4 of Fig. 2.

Referring to the drawing one form of the present invention consists of a base 10 of relatively massive construction for mounting upon a concrete or other solid foundation. The upper face of the base 10 is in the form of a bed plate 11 from which rise rigid straining rods 12 having threaded ends held to the plate 11 by nuts 13. Guide columns 14 preferably of channel section, as shown in Fig. 4 are bolted fast to the bed plate 11 to respectively guide the rods 12 and prevent lateral displacement thereof. The major portion of the length of the rods 12 extend upwardly from the columns 14 and are threaded to respectively receive leader nuts 15, each of which has its outer circumference in the form of a worm gear whereby the nuts 15 can be simultaneously rotated by an actuating spindle 16 carrying worms 17. A squared end 18 of the spindle 16 projects conveniently for engagement by a socket wrench or other tool. The spindle 16 can, of course, be driven by any suitable mechanism. The leader nuts 15 are rotatably mounted at opposite ends respectively of a weighing yoke 20, the central portion of which is apertured to permit the attachment of the jaws or other fastening device by which the test specimen is made fast to the aforesaid yoke 20. It will thus be seen that the yoke 20, the strain rods 12, the columns 14, and the base 10 all form together a complete stationary unit as contrasted to the movable load applying unit consisting of the parts now to be described.

Seated upon the bed plate 11 is an hydraulic support 21 having the usual pressure chamber 22 which communicates by way of a tube 23 with a pressure indicating gage 24. This support 21 carries the cylinder 25 of a pressure fluid unit of which the cooperating part is the piston 26 which is actuated by fluid under pressure transmitted by flexible pipe 27 from a pump or other supply source concealed in the housing 28. As here shown the piston 26 is of cylindrical shape having its projecting end in the form of a head 30 of sufficiently greater diameter to provide two bolt holes for the reception of the respective loading rods 31 which are anchored in vertical parallel relation by nuts 32. The upper ends of these rods 31 extend above the limit of travel of the cross-head 20 where they are interconnected by a load cross-head or yoke 33. From Fig. 1 it will be seen that the yoke 20 passes between the rods 31 to make an efficient and compact construction. The load-cross-head 33 is suitably apertured as shown at 34 for the reception of the test specimen holder and co-axially located with respect to the aperture of the yoke 20. In order to prevent turning of the piston 26 relative to the cylinder 25, two pins 35 are fastened to the head 30 in alinement respectively with holes 36 in the cylinder 26, these pins 35 being of such length that the maximum working stroke of the piston will not withdraw the aforesaid pins 35 from the holes 36. This construction allows free movement of the pins 35 with the movement of the piston but prevents the latter from turning in the cylinder.

For the purpose of allowing the cylinder 25 to have the relatively small vertical movement required with a minimum of friction, two stay plates 37 are bolted to the head 38 of the cylinder and are made fast at their outer ends respectively to the strain rods 12 by fitting over reduced portions of the rods and clamping them by nuts 40 to the columns 14. The stay plates 37 are grooved at intervals to provide sections of reduced area so that the plates have the requisite flexibility. The bottom end of the cylinder 25 is likewise attached to a pair of like stay plates 41 having outer ends suitably made fast to the strain rods 12. This construction maintains straight line movement of the cylinder while preventing all lateral distortion.

As a means for pre-loading the support 21 two rods 42 are fastened to the bed plate 11 and rise vertically to pass through laterally disposed apertured lugs 43 integral with the cylinder 25.

Springs 44 are coiled about the rods 42 and adjusted as to pressure by the nuts 45. These springs 44 supplement the weight of the cylinder 25 in a predetermined manner to ensure the required initial pressure in the chamber 22 to give a zero reading.

In considering the operation of the machine of the present invention it will be observed that the base 10, bed plate 11, strain rods 12, columns 14, and yoke 20 form a unitary fixed structure which resists the test load as applied by the movable structure which includes the cross-head 33, load rods 31, and piston 26. The stationary structure through the bed plate 11, coacts with one side of the hydraulic support 21 while the flexibly controlled cylinder 25 coacts with the opposite side of the hydraulic support 21 so that the combined action compresses the fluid filled chamber 22 in accordance with the load pressure. This compressive action is measured and indicated by the gage 24. This action takes place whether a test specimen is held for a tension test between the yoke 20 and cross-head 33 or for a compression test between the yoke 20 and the piston head 30.

Assuming a specimen is secured in position for a tension test, the admission of fluid under pressure, by way of pipe 27, to the cylinder causes the piston 26 to move outwardly and thereby forcing the cross-head 33 away from the yoke 20 but since the latter is immovable the piston ejecting force reacts against the head of the cylinder 25 to cause the cylinder to compress the hydraulic support and thereby indicate the load applied to the specimen. A like action takes place when a compression test is made. It will be understood that the proper adjustment of the yoke 20 is made lengthwise of the rods 12 in order to mount the specimen in testing position.

Attention is directed to the novel means of measuring the load on the specimen by the reaction of the force applied to the piston instead of having the direct applied force transmitted through movable straining rods and a yoke to a movable column as has heretofore been the practice. Furthermore by the present construction the straining rods rigidly rise from the fixed base and therefore effectively resist side thrust with a consequent better test of the specimen. Also this construction avoids the usual variation in position of the yoke where such is a part of a movable unit, and for which a correction factor must enter each strain gage reading. This is because the rods 12 are always fixed as to position and the datum line practically remains at one level.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. In a machine for testing the strength of materials in tension or in compression, stressing means for producing a load upon the specimen under test, said means including a piston arranged to coact with the specimen when tested for strength in compression, and a cross-head for holding the specimen when tested for tensile strength, a yoke interposed between said piston and said cross-head, a system for weighing the load produced upon said specimen, a base supporting said system, rods rigidly connecting said base and said yoke, and a movable cylinder engaging said weighing system for transmitting the reaction of said loading force from said piston to said system.

2. In a machine for testing the strength of materials in tension or in compression, stressing means for producing a load upon the specimen under test, said means including a piston arranged to coact with the specimen when tested for strength in compression, and a cross-head for holding the specimen when tested for tensile strength, a yoke interposed between said piston and said cross-head, a system for weighing the load produced upon said specimen, a base supporting said system, rods rigidly connecting said base and said yoke, a movable cylinder engaging said weighing system for transmitting the reaction of said loading force from said piston to said system, and flexible means for guiding the movement of said cylinder.

3. In a machine for testing the strength of materials in tension or in compression, stressing means for producing a load upon the specimen under test, said means including a piston arranged to coact with the specimen when tested for strength in compression, and a cross-head for holding the specimen when tested for tensile strength, a yoke interposed between said piston and said cross-head, a hydraulic support for converting the load produced upon said specimen into hydraulic pressure, a base supporting said hydraulic support, rods rigidly connecting said base and said yoke, and a movable cylinder seated on said hydraulic support for transmitting the reaction of said loading force from said piston to said hydraulic support.

4. In a machine for testing the strength of materials in tension or in compression, stressing means for producing a load upon the specimen under test, said means including a piston arranged to coact with the specimen when tested for strength in compression, and a cross-head for holding the specimen when tested for tensile strength, a yoke interposed between said piston and said cross-head, a hydraulic support for converting the load produced upon said specimen into hydraulic pressure, a base supporting said hydraulic support, rods rigidly connecting said base and said yoke, a movable cylinder seated on said hydraulic support for transmitting the reaction of said loading force from said piston to said hydraulic support, and flexible means for guiding the movement of said cylinder.

5. A testing machine comprising a base, straining rods fixed to said base, a yoke connecting said rods, a cross-head, loading rods mounting said cross-head superposed with respect to said yoke to receive a test specimen between them, a movable piston attached to said loading rods, a cylinder receiving said piston, a weighing mechanism supported on said base and supporting said cylinder, and hydraulic means for actuating said piston to cause said cylinder to operate said weighing mechanism.

6. A testing machine comprising a base, straining rods fixed to said base, a yoke connecting said rods, a cross-head, loading rods mounting said cross-head superposed with respect to said yoke to receive a test specimen between them, a movable piston attached to said loading rods, a cylinder receiving said piston, means for flexibly connecting said cylinder to a fixed part, a weighing mechanism supported on said base and supporting said cylinder, and hydraulic means for actuating said piston to cause said cylinder to operate said weighing mechanism.

7. A testing machine comprising a base, rods fixed to said base, rigid means connecting said rods, a cross-head, other rods mounting said cross-head in vertical alinement with respect to said rigid means to receive a test specimen between them, a movable piston for operating said other rods, a cylinder guided for limited vertical movement with respect to said base and receiving said piston, a weighing mechanism supported rigidly with respect to said base and supporting said cylinder, and hydraulic means for actuating said piston to cause said cylinder to operate said weighing mechanism.

BRUCE L. LEWIS.